United States Patent [19]
Mollere

[11] 3,747,637
[45] July 24, 1973

[54] PRESSURE-OPERATED MULTIPORT FLUID CONTROL VALVE

[75] Inventor: John C. Mollere, Houston, Tex.

[73] Assignee: Western Geophysical Company of America, Houston, Tex.

[22] Filed: Sept. 27, 1971

[21] Appl. No.: 183,902

[52] U.S. Cl.............. 137/594, 251/61.1, 137/271
[51] Int. Cl............................................. F16k 11/10
[58] Field of Search.............. 257/61.1, 594, 595, 257/608, 269, 271

[56] References Cited
UNITED STATES PATENTS
2,677,390  5/1954  Davis et al.............. 251/61.1 X
3,407,833  10/1968  Brandenberg...................... 137/271
3,521,850  7/1970  German ........................ 137/271 X OTHER PUBLICATIONS
IBM Technical Disclosure Bulletin, Vol. 7, No. 4, September 1964.

Primary Examiner—Henry T. Klinksiek
Attorney—Michael P. Breston

[57] ABSTRACT

A pressure-operated, multiple-unit, diaphragm-valve is disclosed. Application or release of pilot-pressure to the valve actuates all of several diaphragm elements simultaneously thereby providing substantially instantaneous shutoff of fluid flow through a plurality of pipe lines. Other important features of the valve are its structural simplicity, speed of operation, and its modular construction.

4 Claims, 7 Drawing Figures

PATENTED JUL 24 1973 3,747,637
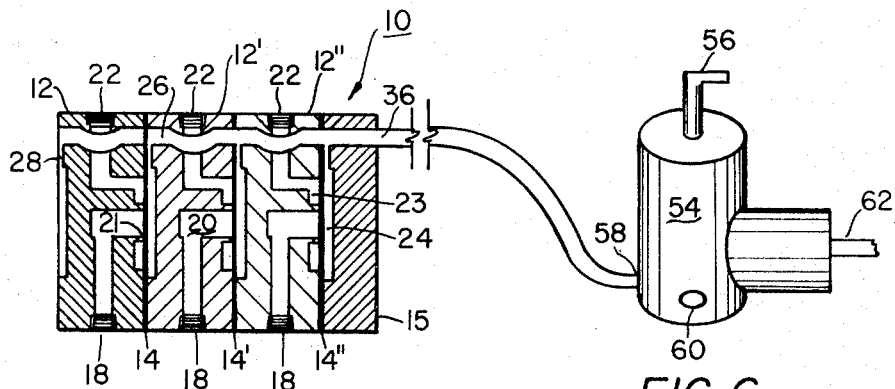
FIG. 1
FIG. 6
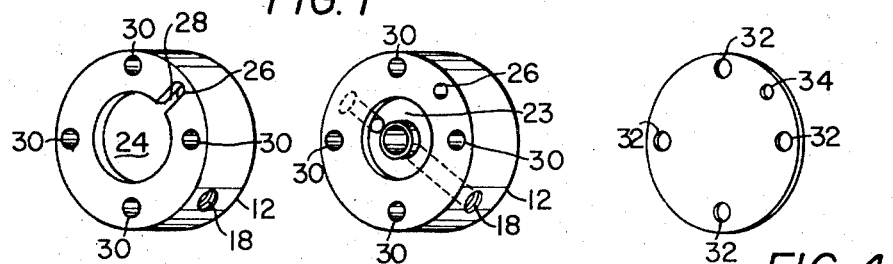
FIG. 2   FIG. 3   FIG. 4
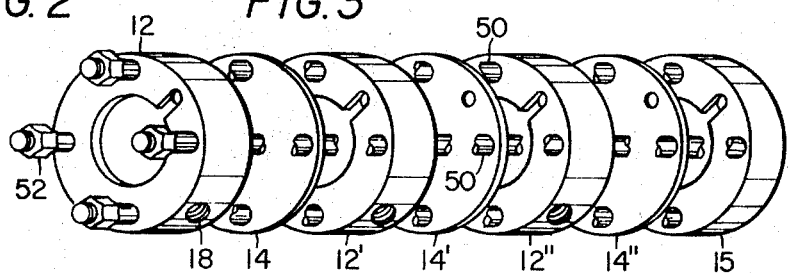
FIG 5
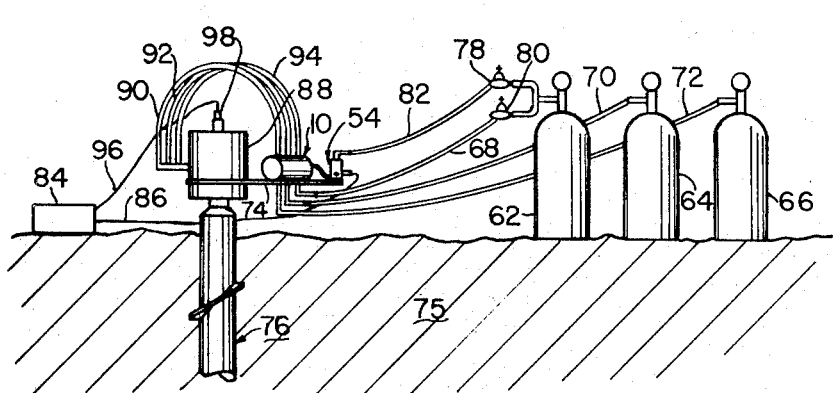
FIG. 7
JOHN C. MOLLERE
INVENTOR.
BY  MICHAEL P. BRESTON
ATTORNEY

3,747,637

PRESSURE-OPERATED MULTIPORT FLUID CONTROL VALVE

BACKGROUND OF THE INVENTION

1. Field of Invention:

This invention relates to the control of fluid-flow through a plurality of pipe lines. In particular this invention permits simultaneous shut-off of a plurality of fluid flow-lines by means of a single pilot-pressure control line.

2. Description of Prior Art:

In certain applications it is necessary to control simultaneously the flow of gases or liquids through a plurality of pipelines. For example, in co-pending application No. 97,932, filed Dec. 14, 1970, there is disclosed a seismic energy source generator for use in seismographic exploration. In this device, metered quantities of propane, oxygen, and compressed air, are fed into an ignition chamber for a specified fill-time. Mixing of the gases occurs in the ignition chamber. Upon command, the gas mixture is ignited by a spark plug, thereby creating the explosion that becomes the source of seismic energy.

If the correct gas-mix ratio is to be achieved, the valves controlling flow of the three gases must open and close simultaneously. If the control valves do not operate simultaneously, one or more gases would be present in excess, and energy output of the sound source would be sub-optimum.

The fill, ignition, and stop-fill commands are controlled by electrical signals from a seismographic recording apparatus. Sequence of events, including valve operation, must be timed precisely within a few milliseconds.

It might be possible to use separate solenoid-type valves to control the gas-flow in each of the three lines. By connecting the solenoids in parallel, a single electric command signal could operate all of the solenoids in unison. However, it is difficult to find a matched set of solenoid valves with identical reaction times.

Mechanical shut-off valves are available such as the solenoid-operated, multiport spool-valves often used in hydraulic work. Mechanical valves are unsuited to this application because their reaction time is too slow due to the inertia of the spool-piece.

Diaphragm valves controlling flow through a single line are not new in the art. For example, U.S. Pat. No. 3,083,943 discloses a pressure-operated diaphragm valve for controlling fluid flow in a single pipe line. This valve is not readily adaptable to multiple use however, nor is it suitable for precise metering of a volume of gas.

There is a need, therefore, for a compact, simple, multi-element valve of modular construction that will simultaneously meter and control fluid-flow through a plurality of pipe lines. It is essential that the reaction time of such a valve be minimal.

SUMMARY OF THE INVENTION

In a broad aspect, the multi-port control valve includes a plurality of similar modules. Each module has an inlet port and an outlet port. The ports are interconnected by a sealable passageway. When the passageways are sealed, the valve is closed.

Flexible diaphragms are positioned adjacent each module. When a pilot-pressure is applied to one side of each diaphragm, the opposite side of the diaphragm is adapted to press against and seal the passageway of an adjacent module. Simultaneous application of pilot pressure to one side of all of the diaphragms results in simultaneous closure of the outlet ports of all of the modules.

In a more specific aspect, each valve module may be cylindrical and may have two end-faces. Inlet and outlet ports are provided around the perimeter of the module. One end-face defines a communication chamber and a sealable orifice which provides fluid communication between the inlet and outlet ports. The opposite end-face defines a pilot-pressure control-chamber in fluid communication with a pilot-pressure manifold.

The multi-port valve may be assembled from a plurality of valve modules positioned end-to-end, with a control chamber of one module facing the communication chamber of the next. Each module is separated from the next by a diaphragm. The control chambers are fluidly interconnected with each other by a manifold. When pilot-pressure is applied through the manifold and control chambers against one side of the diaphragms, the pressure forces the opposite side of the diaphragms to press against the orifices in the communication chambers. This action seals the orifices, closing all of the valve modules simultaneously.

It is a particular feature of this invention that all of the valve modules and diaphragms are identical. It is thereby possible to assemble any number of diaphragms and modules in series to form a multi-port control valve to control as many fluid-flow lines as desired.

In another aspect of this invention, the orifices may have a predetermined diameter to precisely meter the proportion of fluid flowing in each line.

BRIEF DESCRIPTION OF THE DRAWINGS

FIG. 1 is a schematic view of a multiport fluid control valve;

FIG. 2 is a view of a valve module shown from the control-chamber end;

FIG. 3 is an illustration of a valve module shown from the valving end;

FIG. 4 illustrates a diaphragm showing location of a hole used to permit fluid-flow through the pilot-pressure manifold of adjacent modules;

FIG. 5 is an expanded view of the multiport control valve showing the method of assembly;

FIG. 6 illustrates a master valve for applying a pilot-pressure to the control chambers through the pilot pressure manifold; and FIG. 7 illustrates the use of the control valve in conjunction with a seismic energy generator.

In the drawings the same reference characters designate similar parts. Referring now to FIG. 1, a three-port control-valve is illustrated generally as 10. Control valve 10 is composed of cylindrical valve modules 12, 12', 12" separated by flexible diaphragms 14, 14', 14", respectively. A blank end plate 15 seals the end of module 12".

Each valve module, such as 12, includes an inlet port 18, a sealable orifice 20 having a seat 21 on one end-face thereof, and an outlet port 22. Inlet port 18 communicates with outlet port 22 through orifice 20 and a communication chamber 23. If orifice 20 is sealed, inlet 18 is closed from outlet 22.

The inside diameter of orifices 20 may depend upon the quantity of gas to be delivered through the valve.

Thus in certain applications, orifices 20 are metering orifices.

The opposite end-face of valve-module 12 defines a control chamber 24 which communicates with a pilot-pressure manifold 26 through a slot 28 (FIGS. 1 and 2).

Each valve body further defines four holes 30, through which assembly bolts are inserted. The fifth hole 26 defines the pilot-pressure manifold. End-plate 15 defines a pilot-pressure inlet 36 to manifold 26.

When assembled, each valve module is separated, one from the other, by diaphragms 14, 14', 14''. A diaphragm 14 defines four holes 32 through which the assembly bolts are inserted. A fifth hole 34 permits communication between pilot-pressure manifolds 26 of adjacent valve modules. When hole 34 in diaphragm 14 is aligned with manifold 26 in a valve module 12, manifold 26 is open between adjacent modules. If however, diaphragm 14 is rotated 90°, manifold 26 is closed between adjacent modules. The purpose of the sealing function is to terminate the manifold line 26 at end-module 12.

The multiport control valve is assembled using as many modules and diaphragms as are needed to control a number of fluid-flow lines. In FIG. 1, three modules are illustrated. A valve module such as 12 is separated from an adjacent module such as 12' by a flexible diaphragm 14. Bolts 50 (FIG. 5) extend through holes 30 of valve modules 12 and through holes 32 of diaphragms 14. The entire assembly is then secured by nuts 52. In the assembled valves, diaphragms 14 separate two adjacent valve modules, thus defining on each side thereof, two closed chambers, a control chamber 24 and a communication chamber 23.

Fluids to be controlled are admitted under a line-pressure $P_1$ through inlet ports 18. So long as no pressure exists in control chambers 24, the pressure existing at inlet ports 18 and orifices 20, forces diaphragms 14, 14', and 14'' away from orifice seats 21, thus permitting free flow between inlet ports 18 and outlet ports 22 via communication chambers 23. If now, a pilot-pressure $P_2$, where $P_2$ is greater than $P_1$, is applied through pilot-port 36 into control chambers 24, against the right-hand face of diaphragms 14, 14', and 14'', the opposite face of the diaphragms will be forced against seats 21 of orifices 20 thereby shutting off flow between inlet ports 18 and outlet ports 22.

The area of the one side of diaphragms 14 exposed to the control chambers may be greater than the area of the side of the diaphragms facing the communication chambers. Because of this feature, pilot-pressure $P_2$ may be less than the line pressure $P_1$. In a functional test of one valve, a pilot-pressure of 25psi was used to control a line-pressure of 80psi. Although it may be convenient to use a low pilot-pressure, a fast-acting valve requires that the pilot-pressure be greater than the line pressure.

Flexible diaphragms 14 may be made of any convenient material that is resistant to possible chemical reaction by the fluids passing through the control valve. Suitable materials are neoprene, rubber, or plastic. Corrugated metal diaphragms with a rubber seat could also be employed. Valve modules 12 may be made of any suitable material, such as brass or stainless steel.

The multiport control valve is actuated by admitting pilot-pressure to pilot-port 36 through a master valve. Where electrical command signals are employed, the master valve is conveniently an electric solenoid valve, such as Skinner V53-LB-2100.

In FIG. 6, a master solenoid valve 54 is provided, with a pilot-pressure inlet 56, pilot-pressure outlet 58, and exhaust port 60. Electric control line 62 provides means to actuate solenoid valve 54. When electrical current is applied to leads 62, solenoid valve 54 is open and pilot-pressure existing in pilot-pressure manifold 26 is vented through outlet port 58 and exhaust port 60 to the atmosphere. Multiport control valve 10 is now open. When solenoid valve 54 is de-energized, exhaust port 60 is closed, pilot-pressure inlet 56 is opened to outlet port 58, applying a pilot-pressure to inlet 36, closing multiport valve 10.

In a specific application for use with a seismic energy-source generator, there are provided tanks of compressed air, propane, and oxygen, designated respectively as 62, 64, and 66 (FIG. 7). Gas lines 68, 70, and 72 feed the three gases to multiport control valve 10 mounted on a pedestal 74 of a seismic energy source generator 76, which is drilled into the earth 75.

Compressed-air tank 62 has two regulators 78 and 80. Regulator 78 feeds pilot-pressure air to the solenoid valve 54 through control line 82. Regulator 80 supplies fuel-air to line 68. Air pressure in control line 82 is set higher than the pressure of the gases that are fed to the inlets of the multiport control valve.

Control valve 10 is normally closed by application of pilot-pressure from regulator 78. It is opened only long enough to feed the required amount of gas to the seismic energy-source generator.

A fill-and-fire control-box 84 is provided which contains the necessary electronic circuitry to send a start-fill command-signal to solenoid 54 through an electrical line 86. When a fill-command signal issues from electronic box 84, solenoid valve 54 is energized, releasing the pressure in pilot-pressure manifold 26, thereby permitting a mixture of oxygen, propane and air to enter and mix in firing head 88 and seismic energy generator 76, through lines 90, 92 and 94. After a sufficient time has elapsed to produce the required gas-fill, typically 6 seconds, a command issues from the electronic control box 84 via ignition line 96 to spark plug 98. The gas mixture in firing head 88 and seismic energy generator 76 becomes ignited. Simultaneously solenoid valve 54 is deactuated. Deactuation of solenoid valve 54 immediately permits pressure to build up in manifold 26 of multiport control-valve 10 to stop the gas flow.

In this specification, use of the multiport control valve has been discussed with specific reference to its application to a seismic energy-source generator employing gaseous fluids. Many other applications employing also liquids will be apparent to those skilled in the art.

What is claimed is:

1. A pressure-actuated, modular, multiport valve for simultaneous control of passage of fluids through a plurality of flow lines including:

a plurality of valve modules, having first and second end-faces, aligned in series relationship, each of said first end faces defining an orifice having a seat, said orifice being in fluid communication with an inlet port and an outlet port, and each of said second faces defining a control chamber;

a plurality of flexible diaphragm means positioned between each module forming a flexible wall between the orifice of a one of said valve modules and the control chamber of another of said valve modules;

manifold means interconnecting the control chambers of said plurality of valve modules; and means responsive to a control signal to admit fluid under pressure into the control chambers of said valve modules through said manifold means thereby urging said flexible diaphragms against said orifice seats to interrupt fluid communication between said inlet and outlet ports.

2. The multiport valve of claim 1 wherein, said orifices have preselected diameters to meter the volume of flow of fluids through each of said flow lines.

3. The multiport valve of claim 2 wherein, the area of the one side of said diaphragms exposed to said control chambers is greater than the area of the other side of said diaphragms exposed to said orifices.

4. A modular valve for simultaneously controlling the passage of fluids through two distinct flow lines, said modular valve including:

two adjacently-positioned valve modules, each module having an inlet, and outlet, a first end face, and a second end face, each first end face defines a sealable fluid passageway between an inlet port and an outlet port;

each second end face defines a control chamber;

each module defines a pilot-pressure manifold in communication with each control chamber;

a flexible diaphragm for each valve module, each diaphragm having one side facing a control chamber and the other side facing a sealable passageway;

a source of pressurized fluid; and means responsive to a control signal to alternately pressurizing and exhausting said pilot-pressure manifold thereby to alternately press each diaphragm against its adjacent passageway and to disengage each diaphragm from its passageway, thereby to control fluid communication between said inlet and outlet ports.

* * * * *